Nov. 24, 1964 R. H. JOHNS 3,158,778
PHASE MODULATED TELEVISION CAMERA TUBE
Filed March 7, 1962
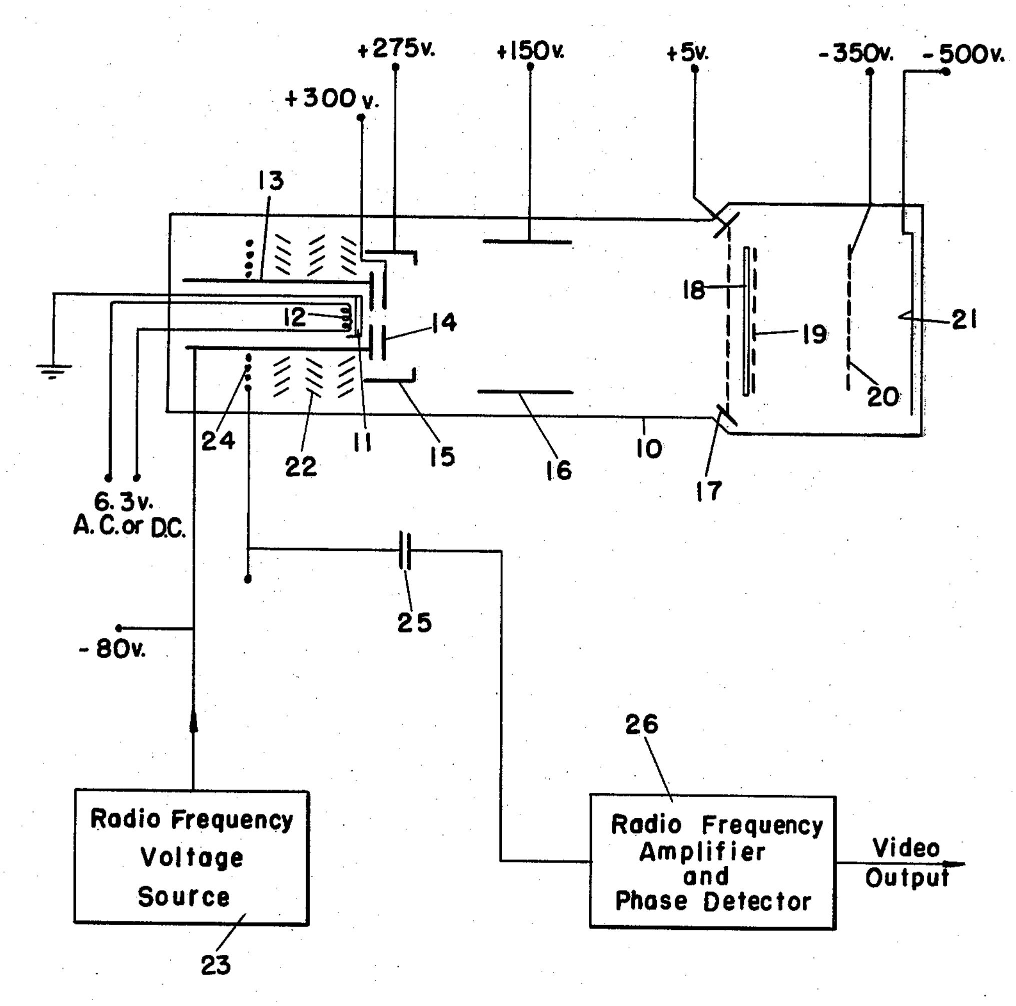
INVENTOR.
ROBERT H. JOHNS
BY
S. J. Rotondi, A. T. Dupont & S. Dubroff
ATTORNEYS.

United States Patent Office 3,158,778

Patented Nov. 24, 1964

3,158,778

PHASE MODULATED TELEVISION CAMERA TUBE

Robert H. Johns, Bryn Athyn, Pa.

Filed Mar. 7, 1962, Ser. No. 178,214
5 Claims. (Cl. 315—11)
(Granted under Title 35, U.S. Code (1952), sec. 266)

The invention described herein may be manufactured and used by or for the Government for governmental purposes without the payment to me of any royalty thereon.

This invention relates to improvements in the circuits and operation of television camera tubes such as are known in the trade as the "Image Orthicon" and are described in a publication entitled "GL–5820 Image Orthicon" and published by the "Electronic Components Division" of General Electric, Schnenectady, N. Y.

As is well known, such a tube includes a target which (1) has on its elemental areas electrical charges representative of the shades of the scene presented to it, and (2) is scanned by an electron beam which is modulated in accordance with these charges and returned to the output circuit of the tube.

As heretofore used, this tube has the disadvantage that its sensitivity is limited by the noise resulting from amplitude variations in the scanning beam. A further disadvantage is that the scanning beam erases the electrical charges and a continuous presentation of the scene is impossible while the camera is storing charge under low light level conditions. The present invention reduces the noise level by interrupting the beam at a radio frequency rate and makes possible a continuous presentation of the scene by maintaining the beam at such a level that it approaches but does not actually reach the target.

The invention will be better understood from the following description when considered in connection with the accompanying drawing and its scope is indicated by the appended claims.

The single figure of the drawing illustrates a television camera tube 10 which includes a cathode 11, a cathode heater 12, a control grid 13, an acceleration grid 14, a multiplier focus grid 15, a beam focus grid 16, a deceleration grid 17, a target 18, a mesh 19, an acceleration grid 20, a photocathode 21 and an electron multiplier 22. Adjacent the various elements of the tube 10 are legends indicating voltages which may be applied thereto in carrying out the invention. These voltages applied to the target ensure that the electron beam does not reach the target so that an image of the scene may be obtained and viewed while the target is storing charge. By appropriate readjustment of these voltages, the beam may be made to reach the target in which the image on the target is erased by each successive scanning operation.

In either case, the noise produced by amplitude variations in the electron beam is eradicated by superimposing on the normal negative voltage of the control grid 13 a radio frequency voltage derived from a source 23. By this radio frequency, the beam is turned off and on, or gated, at a radio frequency rate. The return beam consists of pulses of eletcrons at the same frequency but with a phase delay due to the flight time of the electrons to the target and back.

Thus, if there is no image on the target, this phase delay is constant throughout the scanning. If an image is present on the target 18, however, the travel time of the electrons from the gun to the output of the tube varies, being increased for positively charged areas and decreased for negatively charged areas of the target. As a result, the return beam of electrons is phase modulated in accordance with the shading of the scene.

This phase modulated beam is applied to the input of the electron multiplier 22, the output anode 24 of which is coupled through a capacitor 25 to an amplifier and phase detector 26. Since the phase detector is unresponsive to variations in amplitude, the noise incident thereto is eliminated.

The amount of phase displacement or shift produced on the return beam by certain target charges may be controlled by the potential applied to the grid 17. If this voltage is low, eletcrons decelerate slowly and accelerate slowly in the region close to the target, and consequently longer time differences are effected between charged and uncharged areas.

I claim:

1. A television camera system including means for establishing on a target electrical charges representative of a scene, means for producing an electron beam interrupted at a radio-frequency rate, means for causing said beam to scan said target whereby said beam is phase modulated in accordance with said charges, and an output electrode energized by said phase-modulated beam.

2. A system according to claim 1, wherein the level of said beam is such that it approaches but does not reach said target whereby an image may be stored in said target between periods during which it is being scanned.

3. A system according to claim 1, wherein said output electrode is coupled to means including a phase detector whereby noise produced by amplitude variations in said beam is eliminated.

4. A television camera system, comprising in combination, a television camera tube having a target, means for establishing on said target electrical charges representative of a scene, means for gating said beam at a radio-frequency rate, means for causing said gated beam to scan said target whereby said beam is phase modulated in accordance with said charges, an output electrode energized by said phase-modulated beam, phase-detector means coupled with said output electrode for deriving a phase-modulated video output signal therefrom substantially devoid of amplitude modulation and noise components and means providing a video signal output circuit connection with said detector means.

5. A television camera system comprising the combination defined in claim 4, wherein the output electrode is the output anode of an electron multiplier in the camera tube, and wherein the phase-detector means is capacitively coupled with said output electrode.

References Cited by the Examiner

UNITED STATES PATENTS

| | | | |
|---|---|---|---|
| 2,982,816 | 5/61 | Griengl | 178—7.2 |
| 3,046,333 | 7/62 | Gebel | 178—7.2 |

DAVID G. REDINBAUGH, *Primary Examiner.*

ROY LAKE, *Examiner.*